United States Patent [19]

Fouss et al.

[11] 4,245,924
[45] Jan. 20, 1981

[54] ARCH CONDUIT

[75] Inventors: James L. Fouss; John J. Parker; James L. Child, Jr.; Donald W. Sting, all of Findlay, Ohio

[73] Assignee: Hancor, Inc., Findlay, Ohio

[21] Appl. No.: 967,514

[22] Filed: Dec. 7, 1978

[51] Int. Cl.³ .................... E02B 11/00; F16L 11/11
[52] U.S. Cl. ........................... 405/45; 138/119; 138/121; 405/43; 405/49
[58] Field of Search ............... 405/36, 43–49, 405/124; 138/119, 121, 128, 156, 170, 171, 173

[56] References Cited

U.S. PATENT DOCUMENTS

| | | |
|---|---|---|
| 770,236 | 9/1904 | Lauridtzen . |
| 980,442 | 1/1911 | Schlafly . |
| 2,153,789 | 4/1939 | Carswell et al. ............. 405/49 X |
| 2,286,197 | 6/1942 | Claybaugh ..................... 138/145 |
| 2,433,300 | 12/1947 | Shafer .............................. 405/47 |
| 2,663,997 | 12/1953 | Schmidt et al. ................. 405/49 |
| 2,782,805 | 2/1957 | Leadbetter ..................... 138/168 |
| 3,103,789 | 9/1963 | McDuff et al. ................. 405/45 |
| 3,336,950 | 8/1967 | Fochler ........................... 138/121 |
| 3,343,567 | 9/1967 | Mulligan et al. ............... 138/119 |
| 3,369,367 | 2/1968 | Saad et al. ....................... 405/46 |
| 3,440,822 | 4/1969 | Hegler ............................. 405/45 |
| 3,440,823 | 4/1969 | Olsen . |
| 3,487,574 | 1/1970 | Loof . |
| 3,495,410 | 2/1970 | Bailey et al. .................... 405/46 |
| 3,508,587 | 4/1970 | Mauch ............................. 138/119 |
| 3,528,251 | 9/1970 | Falk . |
| 3,570,251 | 3/1971 | Roberts .......................... 405/46 |
| 3,583,424 | 6/1971 | Bryant ............................ 138/156 |
| 3,653,216 | 4/1972 | Stickler . |
| 3,679,242 | 7/1972 | Hess ................................ 405/49 |
| 3,681,925 | 8/1972 | Schmunk et al. . |
| 3,682,502 | 8/1972 | Corriston et al. ............. 138/119 X |
| 3,721,269 | 3/1973 | Choate et al. ................. 138/119 |
| 3,818,948 | 6/1974 | Hedges ........................... 138/119 |
| 3,830,067 | 8/1974 | Osborn et al. ................. 405/45 |
| 3,908,704 | 9/1975 | Clement et al. ............... 138/121 |

FOREIGN PATENT DOCUMENTS

| | | |
|---|---|---|
| 2262994 | 7/1974 | Fed. Rep. of Germany ........... 405/43 |
| 69088 | 9/1969 | German Democratic Rep. ...... 405/43 |
| 6401043 | 8/1964 | Netherlands .............................. 405/49 |

Primary Examiner—David H. Corbin
Attorney, Agent, or Firm—Fay & Sharpe

[57] ABSTRACT

Disclosed is a foldable arched conduit suitable for use as drain tubing, culverts and the like. The conduit has the cross section of a parabolic arch with a flat base. The arched portion of the conduit comprises a pair of rigid corrugated plastic walls jointed at the apex area by a hinge. The base is constructed from a flexible sheet material which may contain apertures for liquid ingress and egress. For shipment, the rigid walls are folded inward about the hinge with the flexible sheet being folded between the rigid walls in order to present a generally flat configuration. After folding, the conduit may be conveniently rolled or length placed in parallel stacks for reducing the storage and/or shipping space required. At installation, the conduit may be unrolled along the installation site and then caused to expand into its unfolded shape.

31 Claims, 15 Drawing Figures

ARCH CONDUIT

BACKGROUND OF THE INVENTION

This invention pertains to the art of pipe, tubing and conduits. More particularly, it pertains to conduits having a high strength to weight ratio such as corrugated plastic tubing.

The invention is particularly applicable to corrugated plastic drain tubing and will be described with particular reference thereto although it will be appreciated that the invention has much broader applications. For example, the inventive concepts are also deemed applicable to culverts, tunnels, subterranean conduits and the like.

Drainage tubing is conventionally used to remove excess surface and subsurface water from agricultural fields as well as from commercial and residential establishments. Generally, a trench is first dug in the soil by a trench digging machine, the drainage tubing positioned along the base of the trench and the trench is then backfilled. Water entering the tubing at one end and/or over the length thereof is carried to the other end for disposal.

Until recently, drainage tubing primarily comprised short lengths of cylindrical concrete or ceramic tiles. In laying these tiles along the base of the trench, they were typically spaced a small distance apart to provide a small gap for allowing water to enter into the tiles. This spacing was generally in the range of ¼" or so. Shifting of the soil, however, often caused the tiles to become misaligned so that their effectiveness for their intended purpose was diminished. Further, such tile is heavy and cumbersome to handle and install. If heavy loads are applied, or if they are not bedded properly, individual ones of the tiles can break or shift and interrupt the water flow path.

In recent years, use of the individual concrete or ceramic tiles has been replaced by round or cylindrical corrugated plastic drainage tubing for many applications. Lengths of corrugated plastic tubing are fastened together at their ends to alleviate the aforementioned misalignment problems. Such tubing is usually perforated at spaced intervals therealong to allow water ingress and egress. The corrugated configuration generally provides the necessary tubing strength and rigidity, but forms troughs which collect sediment at the bottom or lower most areas thereof. Moreover, the round tubing shape defines a relatively large interior volume which undesirably tends to cause the tubing to fill the volume capacity of transporting vehicles without also filling their weight capacity. While corrugated plastic tubing constructions do not have the breakage problem associated with concrete or clay tile and have largely replaced such tile in many common applications, improper bedding of plastic tubing can result in excessive tubing deflection.

To reduce bulk for shipping, others have produced seamed tubing which is shipped flattened and assembled into its round or other shape just prior to installation. Such an arrangement is shown in, for example, U.S. Pat. No. 3,583,424. Others have attempted to develop collapsible tubing which is folded flat for storage and shipping purposes and then unfolded or opened for installation. Examples of such prior arrangement are shown in U.S. Pat. Nos. 3,343,567 and 3,508,587. However, both the seamed and collapsible tubing constructions have failed to meet with public acceptance for various reasons. Included among these reasons are high cost of manufacture, difficulty in assembling and handling, and a lack of structural strength particularly at the seams or hinges.

The present invention contemplates a structure or article which overcomes all of the above problems and others, and provides a new and improved arched conduit which is economical to manufacture, easy to ship, easy to handle, high in strength and which is readily adapted to use in a broad range of practical applications.

SUMMARY OF THE INVENTION

In accordance with the present invention, there is provided a high strength, light weight corrugated tubing having a hinge-like construction which allows the tubing to be selectively moved from a closed position for reducing shipping bulk to an opened position to accommodate installation.

According to a preferred form of the invention, an arch conduit is provided which is corrugated and substantially rigid around the arch to obtain high strength characteristics. The conduit includes a light weight flexible base spanning the arch configuration adjacent the bottom area thereof.

In accordance with another aspect of the present invention, the corrugations extend generally transverse of the conduit. In addition, the height of the corrugation ribs is greatest, generally intermediate the arch apex area and the base.

In accordance with a further aspect of the present invention, the arched conduit has hinge-like area at the arch apex area to allow selected folding and unfolding. The thin flexible base is constructed from a material which has sufficient tensile strength to limit arch opening at unfolding but which may also be closed or folded commensurate with the arch. In addition, the base may be porous or otherwise perforated to facilitate liquid ingress and/or egress.

According to a further aspect of the invention a method for convenient conduit handling and installation is provided.

One advantage of the present invention is that the new and improved conduit construction is stronger, yet requires less material to manufacture than prior cylindrical plastic tubing of a similar capacity.

Another advantage of the present invention resides in the capabilities of the conduit to be folded so as to reduce its bulk for storage and shipping and in the method of handling same.

Yet another advantage of the present invention is that the conduit base is wide and generally smooth for reducing the amount of sediment collection and, if perforated, the hydraulic gradient of in-flowing liquid.

Still other advantages and benefits for the subject arched conduit construction will become apparent to those skilled in the art upon a reading and understanding of the following specification and accompanying drawings.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

DESCRIPTION OF THE PREFERRED EMBODIMENT

Figure 1:
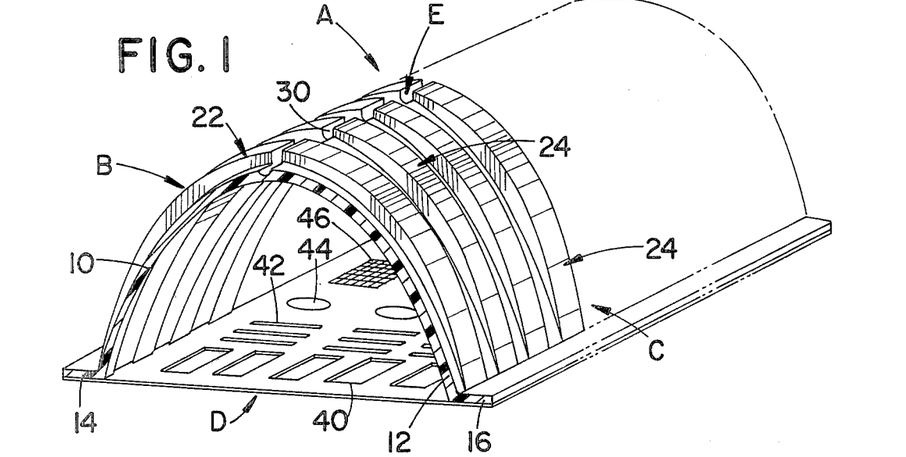
FIG. 1 is a perspective view of a conduit formed in accordance with the concepts of the present invention when it is in its opened position.

Reference is made to the drawings for purposes of illustrating the preferred embodiment of the invention only and not for purposes of limiting the same. The FIG. 1 shows an elongated conduit A comprised of a pair of cooperating spaced apart side walls B, C and a base D. Walls B and C are pivotally connected to each other at a connecting means or hinge E and the opposite side edges of base D are affixed to the walls adjacent the terminal ends thereof.

Figure 2:
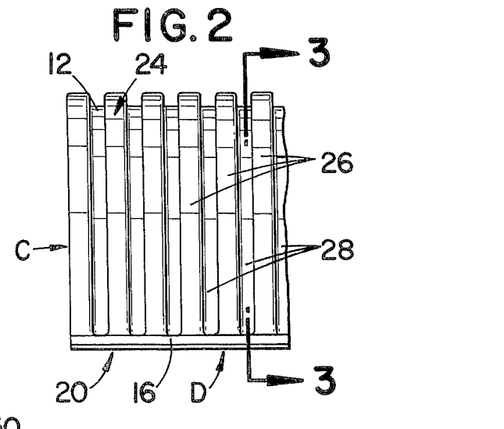
FIG. 2 is a side view of a portion of the conduit shown in FIG. 1.
Figure 3:
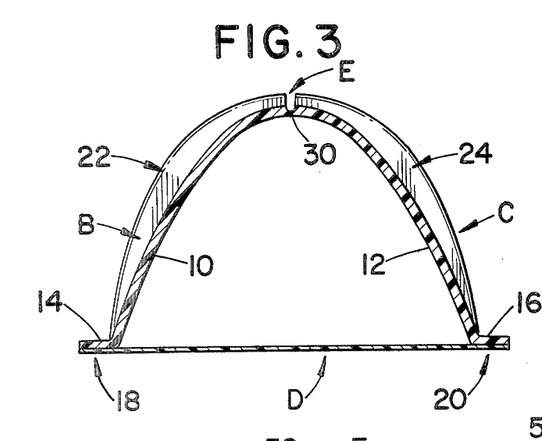
FIG. 3 is a cross-sectional view taken along line 3—3 of FIG. 2.

In the preferred embodiment shown in FIGS. 1-3, conduit A is generally arched shaped in cross section. In particular, it has been determined that a parabolic inside cross section with a height to width ratio of approximately 0.65 provides a desirable balance between compressive strength and flat folding characteristics. Additional advantages for this configuration will become more readily apparent hereinafter.

Alternately, however, the arched cross section of the conduit could have a generally triangular shape with first and second walls B,C being generally linear. This shape enables the conduit to be folder to a very flat condition, but is lacking in compressive strength. Moreover, first and second walls B,C may be more rounded for increasing compressive strength. These walls may define semi-circular, semi-eliptic, multiradii, linearly and/or arcuately segmented, or other generally arched cross sections. The advantages and suggested uses of these alternate embodiments are set forth below.

In the preferred embodiment, side wall B is comprised of a first wall 10 and side wall C is comprised of a second wall 12 which are shaped in a manner such that in the unfolded position best illustrated in FIGS. 1 and 3, they form a generally parabolic arch. Wall 10 includes an outwardly extending foot or flange 14 adjacent the terminal side edge thereof and wall 12 includes a foot or flange 16 which is similarly located. These flanges provide bearing surfaces 18 and 20 on which the conduit may rest on installation and also provide convenient surfaces for attaching the opposite side edges of base D thereto.

The first and second walls include spaced apart corrugations over the lengths thereof. These corrugations are comprised of a series of raised ribs which are typified by ribs 22 on wall 10 and ribs 24 on wall 12. These ribs are defined by a plurality of alternating, interconnected peaks 26 and valleys 28 as is best shown in FIG. 2. The ribs, especially the portions thereof which extend generally normal to walls 10,12 and connect the adjacent peaks and valleys, provide superior resistance to compressive forces or loading. Although the ribs may be of constant height as is conventional in prior round corrugated tubing constructions, the ribs of the subject preferred embodiment are more round than are walls 10,12 as is best shown in FIG. 3. In particular, ribs 22,24 are contoured to have a height at each point along their respective walls which corresponds to its tendency to deflect.

In a subterranean installation, the conduit is subjected to loading and compressive forces from the soil and subsurface water. The compressive forces from the soil primarily arise from the backfill in the trench. This produces a generally parallel plate-type of loading. Subsurface water and water flow through the conduit produce generally hydrostatic loading. A parabolic cross section is relatively strong in supporting parallel plate loading, but relatively weak with regard to hydrostatic loading. Under the parallel plate loading of a normal installation there is a tendency for the parabolic arch to be deformed slightly into a more rounded cross section. This rounding increases the conduit's strength under hydrostatic loading. Further, the crown surface of corrugation ribs define a more rounded, generally semi-eliptic or semi-circular contour. This corrugation contour has a cross section which is relatively strong under hydrostatic load. As discussed below, alternate arch cross sections are advantageous under certain loading conditions.

The parallel plate and hydrostatic loading tend to deflect the conduit. For an arched structure, the amount of deflection is not constant at all points. For example, at the arch base, the deflection is generally zero. Indicia of the degree of deflection include the bending moment and moment of inertia.

As noted, one indicator of the necessary or desired rib height at each point along the arch is the bending moment of the arch structure at that point. By analyzing the structure mathematically or by using force diagrams, the bending moment at points along the arch under expected loading conditions is readily determinable. The moment of inertia at each point along the arch is a function of several factors, including rib height, material thickness and the like. The rib height is selected such that the moment of inertia at each point along the arch conforms to a predetermined function of the bending moment at the same point. In the preferred embodiment, the rib height is selected such that the moment of inertia is directly proportional to the bending moment at each point. Alternately, the moment of inertia may be proportional to the bending moment squared or proportional to the sum of the bending moment and the secant of the angle of the tangent at each point. One method of determining the rib height corresponding to the selected functional relationship between the moment of inertia and bending moment is by successive approximations. Because the bending moment and moment of inertia are essentially zero at the apex and base edges of a parabolic arch, ribs 22 and 24 in the preferred embodiment taper substantially inward toward walls 10,12 adjacent their terminal ends. Such a taper is shown in FIG. 3 adjacent flanges 14,16 and adjacent hinge E.

Walls 10,12 of the preferred embodiment here under discussion are manufactured from a thermoplastic material such as ABS or other styrene polymers, polyethylene, or the like. However, other types of plastics and materials could be advantageously employed without departing from the overall intent or scope of the invention.

As shown in the FIGURES, connecting means or hinge E is preferably located along the arch apex at the area where walls 10,12 are connected. This location is preferred because the apex of a parabolic arch has a zero bending moment. Moreover, this geometrical configuration facilitates fairly compact folding. Although seams, welds and many other types of multi-element connecting means constructions may be advantageously employed, it is preferred that this connecting means be formed integral with walls 10,12 in the general nature of a hinge.

Hinge E includes a small trough 30 cut or molded into the inner or outer surfaces of the arch in order that the apex will be somewhat thinner than walls 10,12. This increases the flexibility of the conduit at the hinge area for accommodating folding and bending. The depth of trough 30 compared with the height of walls 10,12 on either side thereof varies with the material chosen for tubing manufacture. Generally, this is based on such factors as material strength and material flexibility when compared against fatigue resistance. With some materials, a simple lack of corrugations at the apex would be sufficient to form the hinge. Ribs 22,24 may either be spaced a small distance apart at the apex area or may include shoulders which abut each other to inhibit the conduit from unfolding beyond the desired overall parabolic shape.

First and second walls 10,12 are designed to have high bending strength, whereas base D is designed to have high tensile strength. In the preferred arrangement, base D is desired to rest directly on the bottom of a trench from which it receives support for the weight of the liquids conveyed. In addition to the forces from the weight of the conveyed liquids the base is subject to forces tending to cause walls 10,12 to spread apart from each other. For example, top loading forces on the arch construction such as are encountered from backfilling will tend to force flanges 14,16 outwardly along the bottom of the trough to thereby allow the arch to become flattened. To prevent such spreading beyond the desired shape, some type of tensile strength or force is typically required. Base D itself has sufficient tensile strength under normal loading condition to meet this need.

Figures 4, 5:
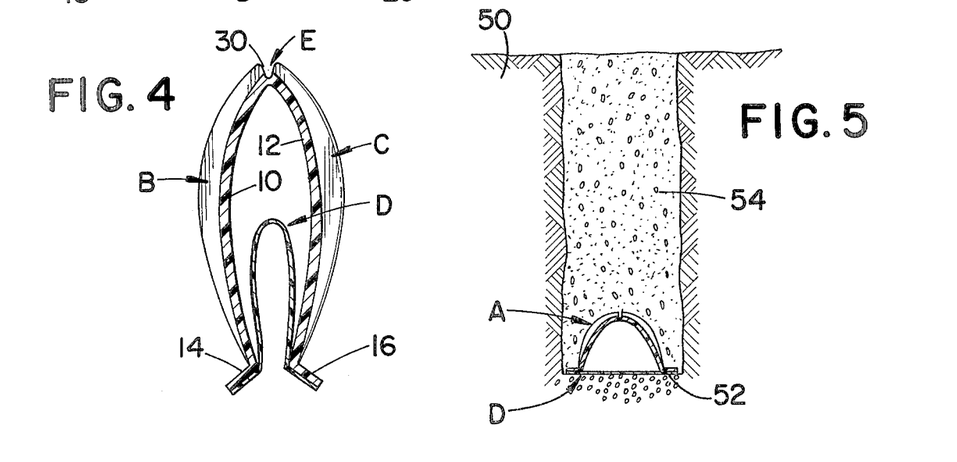
FIG. 4 is a cross-sectional view of the conduit when it has been moved to its folded position.
FIG. 5 is a cross-sectional view of the conduit shown in FIG. 1 when it has been installed in a subterranean environment.

Another desirable physical characteristic for the base is that it is sufficiently foldable to enable the arch to be folded in the manner shown in FIG. 4. In this folded position, flanges 14,16 are moved toward each other to a generally abutting relationship. To enable the arch to be folded, base D is designed to pivot or fold adjacent flanges 14,16 and along at least one generally intermediate area. This result can be accomplished with the use of a generally rigid sheet having three or more hinges or with the use of a flexible sheet-like material. In the preferred arrangement, a thin flexible sheet of plastic material is contemplated for use, e.g. a 3 mil sheet. Polymeric materials such as polyethylene, MYLAR, metallic foils and the like would be satisfactory. Other, more rigid materials that are hinged or removable may also be used. When folding is not necessary or particularly advantageous for one reason or another, the base may comprise a permanently attached rigid element or a plurality of spaced elements.

The opposed side edge areas of base D are attached to flanges 14,16 by convenient means such as sewing, gluing, welding, stapling, friction engagement or the like. The particular attaching means used is, to some extent, regulated by the materials from which conduit walls 10,12 are manufactured and the particular use contemplated for the conduit.

For transporting fluids, the base may be imperforate and for collecting or dispersing liquids, the base may be perforated. For some uses such as culverts or underpasses, the base may be comprised of periodically spaced elements such as cables or the like. It may even be possible to entirely eliminate the base in some specific applications of the subject inventive concepts.

For collecting or dispersing liquids, apertures may be provided in base D in a variety of manners such as is generally shown in FIG. 1. For example, a series of openings 40 may be cut out of the base, a series of slits 42 may be cut into the base, or a series of flaps 44 may be stamped into the base. In addition, the base may be comprised of a mesh 46 or contain sections of mesh interspaced between sections of solid or otherwise apertured film material. More particularly, mesh 46 may comprise nylon net, plastic impregnated fiber screen, polymeric spun bonded filter cloth and the like. A suitable polymeric spun bonded filter cloth is marketed by E. I. Dupont deNemours & Co., Inc. under the trademark TYPAR.

Numerous other aperture systems may also be used while practicing the overall inventive concepts involved. In that regard, suitable apertures may be cut into walls 10,12 or into ribs 22,24 instead of or in addition to the apertures in base D. It has been found advantageous, however, to place the apertures or openings in the base because of its large surface area. This large surface area enables a relatively large number of apertures to be provided which facilitate greater ingress and/or egress of fluids. For example, if 15% to 20% of the surface area of base D is perforated, approximately 8 to 12 times as much effective water entry area is provided than is present in conventional cylindrical or round perforated tubing. Further, the hydraulic gradient which is related to the difference between the pressure of fluids within the tubing to the pressure of fluids exterior to the tubing is reduced as the number or size of apertures increase. As the hydraulic gradient is decreased so too is the amount of soil particles which are apt to be broken away by the liquids or water and carried into the tubing.

With regard to the manufacture and use of conduit A, one preferred method of manufacture employs conventional blow molding techniques on a continuous blow molding machine whereby first and second walls 10,12 and hinge E and integrally molded together. Other forms of fabrication such as casting and stamping may, of course, also be used. The preferred polymeric film material used for base D is unwound from a reel for continuous bonding at its side edge areas to flanges 14,16 in conjunction with the continuous blow molding operation. The arch is then folded at hinge E (FIG. 4) with base D folded to the inside of the conduit walls. The folded conduit may then be rolled in much the same manner as a fire hose to form a coil for compact storage and shipment.

At a typical installation site such as that schematically shown in FIG. 5, a trench is dug in soil 50 with conventional trenching equipment. The conduit is then unrolled onto the generally smooth trench bottom or floor 52 or onto some other base. The conduit is expanded to its arched shape (FIGS. 1 and 3) either by the inherent resiliency of the plastic construction or by the application of a vertical pressure near the arch apex area. Loose soil 54 is then backfilled into the trench as is also conventional. For installations where the conduit concepts are to be utilized to form a culvert, the conduit is positioned over a lower bed or base and earth is then graded thereover.

Alternate Preferred Embodiments

The preferred parabolic arch cross section with a height to width ratio of generally 0.65 is a compromise among several factors including strength under parallel plate loading, strength under hydrostatic loading, maximizing the hydraulic capacity, miniimizing the amount of material in the arched portion, optimizing flattened folding characteristics, simplifying fabrication, and many others. The selected compromise achieves an excellent all-around versatile conduit. However, there are other general purpose conduit shapes and special purpose conduit shapes which for some purposes are more advantageous than the parabolic conduit of the preferred embodiment.

Figure 6:
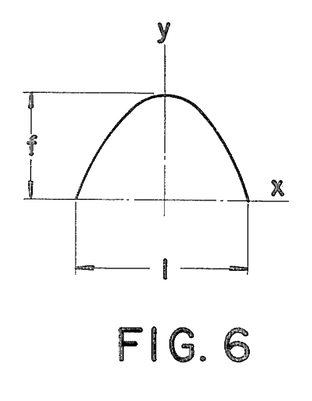
FIG. 6 illustrates a parabola.

Generally, a parabolic such as defines the parabolic cross section of the preferred embodiment is defined by the formula $$y = \frac{4fx}{l^2}(l - x) \tag{1}$$

Where f is the height of the parabola and l is the width of the base area. (See FIG. 6)

Figure 7:
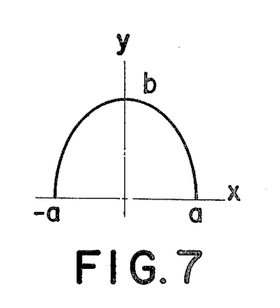
FIG. 7 illustrates a semi-elipse.

Another preferred cross section is defined by a semi-ellipse, which is illustrated in FIG. 7 and defined generally by the formula $$\frac{x^2}{a^2} + \frac{y^2}{b^2} = 1 \tag{2}$$

where a and b are the major and minor axes, b defining the height and 2a the width of the arch.

Figure 8:
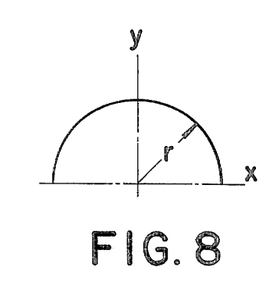
FIG. 8 illustrates a semi-circle.

When the major and minor eliptic axes are equal a third preferred cross section, the semicircle, is formed. This cross section, illustrated in FIG. 8, is generally defined by the formula $$x^2 + y^2 = r^2 \tag{3}$$

where r is the radius.

Figure 9:
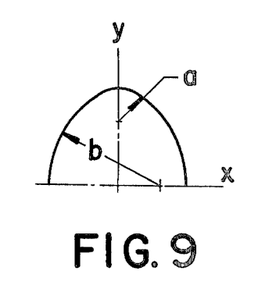
FIG. 9 illustrates a multiradii arch.

The multiradii and linear and/or arcuate segmented cross sections are defined by a multitude of formulae. FIG. 9 is illustrative of an exemplary miltiradii cross section with constant radius segments.

Figure 10:
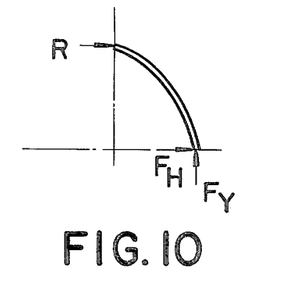
FIG. 10 illustrates forces on an arch.

As stated above, a major design criteria is the maximization of tubing strength, in particular, compressive strength. Under the numerous and various loading conditions which the conduit may be placed, different cross sections provide maximum strength. The force components on an arch under load are describable in terms of the horizontal $F_H$ and vertical $F_V$ components shown in FIG. 10. The cross-sectional shape of an arch is defined by the relationship between x and y which describe each point (x,y) on the arch. To determine the strongest cross-sectional shape under a specific applied load, the design load on the arch is maximized for the expected environment and the bending moment is defined as zero. The relationships between all points (x,y) which meet this criteria defines the cross-sectional shape which best withstands the selected specific load.

For a hydrostatic load, q, which is applied to an arch, it is known that $$F_V - (ql/2) = 0 \tag{4}$$

$$R + F_H - qf = 0 \tag{5}$$

where R is the resulting horizontal force at the apex. It is also known that the bending moment, M, at each point (x,y) is $$M = F_V(\frac{l}{2} - x) + F_H y - \frac{q}{2}[(\frac{l}{2} - x)^2 + y^2] \tag{6}$$

Assuming, if deflection occurs only from bending, then $$\frac{M}{EI} = (\frac{1}{R_o} - \frac{1}{R}) \tag{7}$$

where E is the modulus of elasticity, I is the moment of inertia and $R_o$ is the original radius of curvature.

Figure 11:
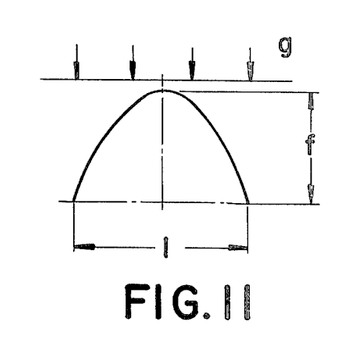
FIG. 11 illustrates forces on an arch under parallel plate loading.

If the load, q, is uniform vertical loading, i.e. applied only vertically as shown in FIG. 11, then equations corresponding to (4)–(7) reduce to the following relationships between x and y:

$$x^2 - \frac{l^2}{4} + \frac{yl^2}{4f} = 0 \tag{8}$$

which equation when translated l/2 units in the positive direction becomes $$Y = \frac{4fx}{l^2}(l - x) \tag{9}$$

which is easily recognized as a parabola.

Figure 12:
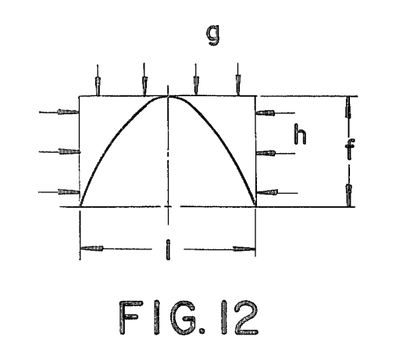
FIG. 12 illustrates forces on an arch.
Figure 13:
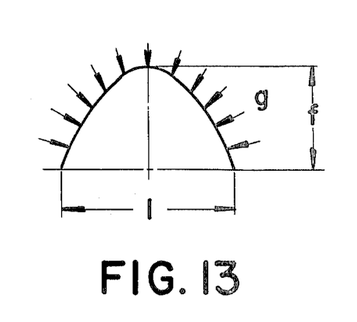
FIG. 13 illustrates forces on an arch under hydraulic loading.

If the load q is a uniform vertical and horizontal load as illustrated in FIG. 12, defined by a vertical component $q_V$ and horizontal component $q_H$, then equations corresponding to (4)–(7) reduce to the following relationships between x and y, $$\frac{x^2}{2} + \frac{q_H y^2}{2q_V} + y(\frac{l^2}{8f} - \frac{q_H f}{2q_V}) - \frac{l^2}{8} = 0 \tag{10}$$

which equation when the substitution $$k = \frac{q_H}{q_V} = \frac{l^2}{4f^2} \tag{11}$$

is made reduces to $$\frac{x^2}{l^2/4} + \frac{y^2}{f^2} = 1 \tag{12}$$

which is readily recognized as an ellipse,

If load q is hydrostatic loading, i.e. uniformly applied perpendicular to each point (x,y) on the arch as illustrated in FIG. 13 then equations (4)–(7) reduce to the following relationship between x and y.

$$x^2 + y^2 + y\left(\frac{l^2}{4f} - f\right) - \frac{l^2}{4} = 0 \tag{13}$$

which equation when the substitution $$r = f = l/2 \tag{14}$$

is made reduces to $$x^2 + y^2 = r^2 \tag{15}$$

which is, of course, a circle.

Similarly, for other loading conditions, various other cross-sectional shapes of the arch are preferred.

The round corrugated tubing industry has developed standard sizes of tubing, such as 4 inch diamter, 6 inch diameter, etc. For customer and governmental acceptance, it is advantageous to match the fluid carrying capacity, also known as the hydraulic capacity, of arched tubing to standard round tubing sizes.

The hydraulic capacity, Q, of a conduit is the product of its cross-sectional area for flow, A, and the flow velocity of the fluids therein, V, i.e.

$$Q = AV \tag{16}$$

The flow velocity, however, is determined by several factors such as the roughness of the surface of the conduit, expressable as the roughness coefficient, n; the hydraulic radius, $H_R$, which is defined as the ratio of the cross-sectional area to the wetted perimeter; and the hydraulic gradient, S. A generally accepted relationship between the flow velocity and these factors is $$V = \frac{1.49}{n} H_R^{\frac{2}{3}} S^{\frac{1}{2}} \tag{17}$$

When manufactured of a similar material and installed in a similar manner the roughness coefficient and hydraulic gradient are generally the same for both arched and round corrugated conduit. The equivalent cross-sectional area for arched conduit, where subscript a indicates arched and subscript c circular, thus is:

$$A_a = A_c \left(\frac{H_{Rc}}{H_{Ra}}\right)^{\frac{2}{3}} = \pi r^2 \left(\frac{\pi r^2 / 2\pi r}{H_{Ra}}\right)^{\frac{2}{3}} \tag{18}$$

where, of course, the hydraulic radius of the arched conduit is a function of its cross-sectional area and perimeter. For simplification of equation (18), a dimensionless constant, $\mu$, can be defined as the ratio of the arch hydraulic radius to the square root of the cross-sectional area.

$$A_a = \frac{\pi^{\frac{3}{2}} r^2}{(2\mu)^{\frac{3}{2}}} \tag{19}$$

For a parabola the hydraulic radius can be shown to be:

$$H_R = \tag{20}$$

$$\frac{(\frac{2}{3})f}{\frac{l}{2}(1 + 16(\frac{f}{l})^2)^{\frac{1}{2}} + \frac{1}{16f}\ln\left(\frac{(1 + 16(f/l)^2)^{\frac{1}{2}} + 4(f/l)}{(1 + 16(f/l)^2)^{\frac{1}{2}} - 4(f/l)}\right) + 1}$$

For an ellipse, in which radius a is greater than radius b, the hydraulic radius can be shown to be $$H_R = \frac{\pi b}{4a(0.2854 \cos\theta + 0.1427 \cos 2\theta + 2.1427)} \tag{21}$$

where $$\theta = \sin^{-1}\frac{(a^2 - b^2)^{\frac{1}{2}}}{a} \tag{22}$$

For an ellipse in which radius a is less than radius b, the hydraulic radius can be shown to be $$H_R = \frac{\pi a}{4(0.2854\cos\theta' + 0.1427\cos 2\theta' + 1.1427 + a/b)} \tag{23}$$

where $$\theta' = \sin^{-1}\frac{(b^2 - a^2)^{\frac{1}{2}}}{b} \tag{24}$$

When radii a and b are equal, the ellipse is a semi-circle of radius r in which $$H_R = \frac{\pi r}{4 + 2\pi} \tag{25}$$

Similarly, hydraulic radii may be determined for other arch cross sections.

From these hydraulic radii, the area of a selected cross section of the arch corresponding to each standard size of round tubing can be determined as a function of the ratio of the arch height to width.

A specific conduit which is equivalent to 4 inch round conduit has parabolic cross section with a height, f, of 3.7 inches and a width, l, of 5.9 inches.

Another design parameter is the minimization of the amount of material in the arch tubing. This may be achieved by minimizing the perimeter of the cross section for a given hydraulic radius. The hydraulic radius, however, is inversely proportional to the perimeter. Thus, determining the height to width ratio at which the above identified constant $\mu$ is maximized determines the height to width ratio which minimizes material.

Figure 14:
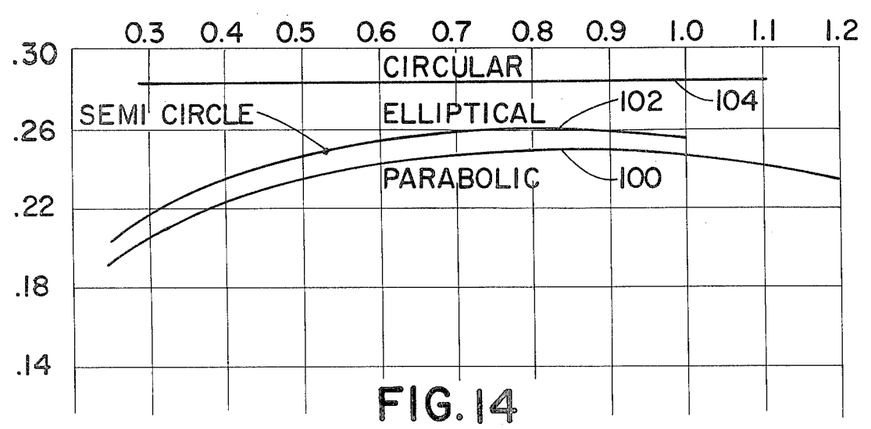
FIG. 14 is a graph of the hydraulic radius/(area)$^{\frac{1}{2}}$ versus the height/width ratio for an arch.

FIG. 14 is a graphic plot of the constant $\mu$ versus the ratio of the height to the width of an arch. It may be noted that curve 100 for a parabolic arch peaks at a height to width ratio of about 0.885. Curve 102 for a semi-eliptic arch peaks at a height to width ratio of about 0.883. The circular cross section, 104, is, of course, the most efficient in this regard.

The height to width ratio of the arch also affects the strength of the arch. In many installations there is some deflection of the cross section. From the deflection formula (7) it is apparent that the amount of deflection can be reduced by varying the moment of inertia, I(x,y), at each point on the arch with the moment M(x,y) at the same point on the arch, i.e.

$$I(x,y) = f(I_o, M(x,y)) \tag{26}$$

where $I_o$ is the moment of inertia at the apex of the arch. In particular, it is advantageous to vary the moment of inertia with the secant of the angle $\phi$ of the tangent at point (x,y) with respect to the horizontal.

$$I(x,y) = I_o \sec\phi + CI_o M(x,y) \quad (27)$$

where C is an arbitrary constant.

Advantageous results are also achieved by varying the moment of inertia as the square of the bending moment.

$$I(x,y) = f(I_o M^2(x,y)) \quad (28)$$

Further advantageous results have been achieved by varying the moment of inertia as a function of the bending moment $$I(x,y) = M(x,y) \quad (29)$$

These variations in the moment of inertia are achieved by varying the height of the corrugations.

Figure 15:
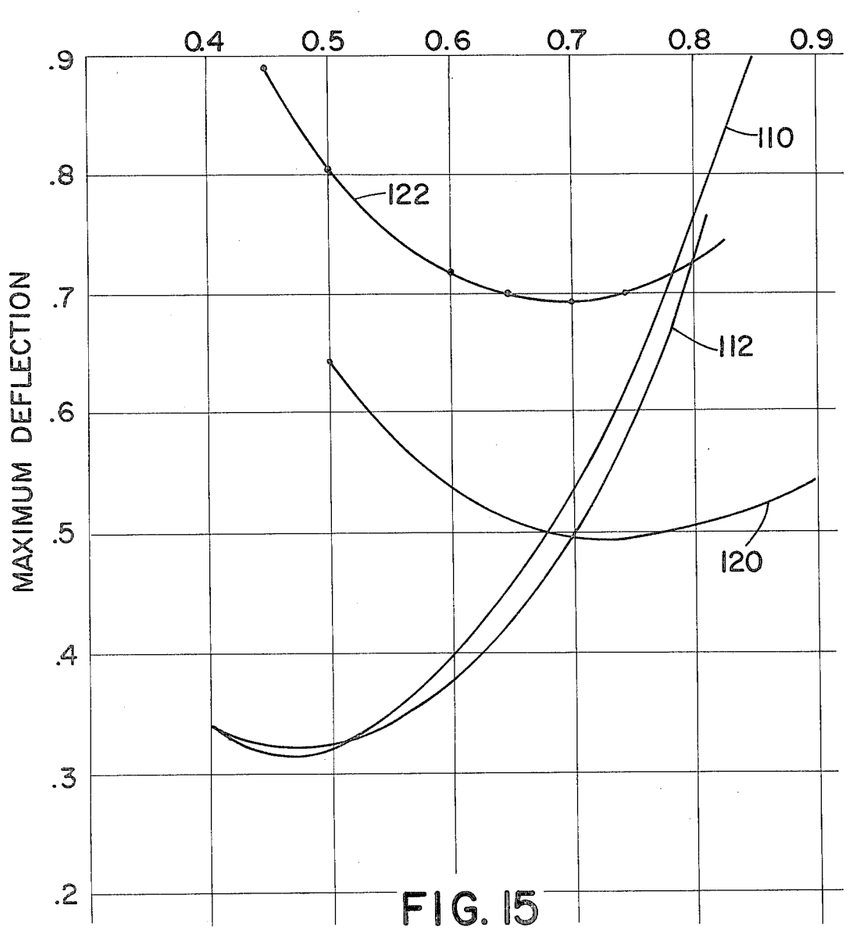
FIG. 15 is a graph of maximum deflection versus the height/width ratio for parabolic conduit.

FIG. 15 is a graphic illustration of the height to width ratio versus the maximum deflection for a parabolic arch. Curve 110 illustrates the maximum deflection under hydrostatic loading when $I = f(I_o,M)$ and curve 112 when $I = f(I_o,M^2)$. Curve 120 illustrates the maximum deflection under parallel plate loading when $I = f(I_o,M)$ and curve 122 when $I = f(I_o,M^2)$. It will be noted that deflection is minimized when $I = f(I_o,M)$.

From FIG. 15 it is also apparent that the height to width ratio of about 0.475 the parabolic arch produces the greatest hydrostatic loading resistance. But it is also apparent that a height to width ratio of about 0.7 to 0.85 produces the greatest parallel plate loading resistance. The preferred height to width ratio for strength is thus in the range of about 0.45 to 0.90. The ratio of 0.65 is particularly advantageous.

From the above considerations and others the design including the cross-sectional shape of the conduit can be modified to bring out specific one or ones of the above advantageous properties.

The invention has been described with reference to the preferred embodiment. Obviously, modifications and alterations will occur to others upon a reading and understanding of this specification. It is our intention to include all such modifications and alterations insofar as they come within the scope of the appended claims or the equivalent thereof.

We claim:

1. A foldable conduit comprising:
    an imperforate first wall which is elongated in one direction having a first wall apex side edge area and an opposed first wall terminal side edge area, said first wall being relatively stiff to resist compressive loading;
    an imperforate second wall which is elongated in said one direction having a second wall apex side edge area and an opposed second wall terminal side edge area, said second wall being relatively stiff to resist compressive loading;
    means for connecting said first and second walls along said one direction at generally said first and second wall apex side edge areas, said connecting means allowing said first and second walls to be arcuately moved toward and away from each other, whereby said first and second walls are moveable between a folded position in which said first and second wall terminal side edge areas are substantially adjacent and an unfolded fluid conveying position in which said first and second wall terminal side edge areas are displaced from each other; and
    a non-corrugated flexible base connected in both the folded and unfolded positions adjacent said first wall terminal side edge area and connected in both the folded and unfolded positions adjacent said second wall terminal side edge area, said base being elongated in said one direction and having a width disposed between the first and second wall terminal side edge areas, the width of said base limiting the amount by which said first wall terminal edge area and said second wall terminal side edge area can be displaced in the unfolded position and the base being sufficiently flexible across its width that in the folded position said base is adapted to be disposed in a generally folded configuration between said first wall and said second wall.

2. The foldable conduit as set forth in claim 1 wherein said base comprises a flexible plastic film.

3. The foldable conduit as set forth in claim 2 wherein said plastic film includes perforations.

4. The foldable conduit as set forth in claim 3 wherein said perforations comprise a plurality of slits disposed at spaced intervals along said one direction.

5. The foldable conduit as set forth in claim 2 wherein said first and second walls are constructed from corrugated plastic and wherein said plastic film is welded to said first and second wall terminal side edge areas.

6. The foldable conduit as set forth in claim 1 wherein said flexible base comprises a mesh-like material.

7. The foldable conduit as set forth in claim 1 wherein said first wall includes a first outwardly extending flange along said first wall terminal side edge area and said second wall includes a second outwardly extending flange along said second wall terminal side edge area, said base being affixed to said first and second flanges.

8. A foldable, partially corrugated conduit comprising:
    a first wall which is elongated in one direction and which has a plurality of first corrugations extending generally transverse to said one direction, said first corrugations extending generally between a first wall apex side edge area which extends substantially in said one direction and a first wall terminal side edge area which extends substantially in said one direction;
    a second wall which is elongated in said one direction and which has a plurality of second corrugations extending generally transverse to said one direction, said second corrugations extending generally between a second wall apex side edge area which extends substantially in said one direction and a second wall terminal side edge area which extends substantially in said one direction;
    hinge means connecting said first wall apex side edge area with said second wall apex side edge area, said hinge means providing for said first wall and said second wall to move arcuately generally about the hinge means at least between a folded position in which said first wall terminal side edge area and said second wall terminal side edge area are generally adjacent each other and an unfolded position in which said first wall terminal side edge area and said second wall terminal side edge area are displaced from each other; and a foldable base which is elongated in said one direction, said base being connected substantially adjacent said first wall terminal side edge area and being connected substantially adjacent said second wall terminal side edge area, said foldable base being foldable at least generally along a first fold area disposed substantially adjacent said first wall terminal side edge area, generally along a second fold area disposed substantially adjacent said second wall terminal side edge area, and generally along at least a third fold area extending in one direction, said third fold area being disposed generally intermediate said first fold area and said second fold area, whereby said foldable base is foldable along at least the first, second, and third fold area as said conduit is moved between the folded and unfolded positions.

9. The foldable conduit as set forth in claims 8 wherein said first and second walls have opposed arcuate configurations generally transverse to said one direction.

10. The foldable conduit as set forth in claim 9 wherein in said folded position said first and said second walls form an arch with said hinge means being located at substantially the apex area thereof.

11. The foldable conduit as set forth in claims 8 wherein said first and second corrugations include peaks and valleys, said peaks projecting outward to define an outside surface of the first and second walls and said valleys recessed inward to define an inside surface of the first and second walls.

12. The foldable conduit as set forth in claim 11 wherein said outside surface has a cross section which is generally semi-eliptical in shape.

13. The foldable conduit as set forth in claim 11 wherein said outside surface has a cross section which is generally semi-circular in shape.

14. The foldable conduit as set forth in claim 11 wherein said inside surface has a cross section which is substantially parabolic.

15. The foldable conduit as set forth in claim 14 wherein said parabolic cross section has a height between the connected first and second wall apex side edge areas and the base and wherein the ratio of the height to the width of said base is in the range of 0.45 to 0.90.

16. A foldable conduit for conveying fluids in a subterranean installation in which a base of the conduit is adapted to be disposed on a generally flat floor of a trench in an unfolded position and in which the trench is adapted to be backfilled over the conduit, the conduit comprising:
a first side wall which is elongated in a longitudinal direction and arcuate transverse to the longitudinal direction, said first side wall being relatively strong to resist compressive loading forces from the backfill;
a second side wall which is elongated in the longitudinal direction and arcuate transverse to the longitudinal direction, said second side wall being relatively strong to resist compressive loading forces from the backfill;
a longitudinally elongated hinge area interconnecting said first side wall and said second side wall at an apex area which is disposed opposite said base, said first side wall and said second side wall being adapted to be moved arcuately about the hinge area between a folded position in which the first and second side walls are generally parallel to each other and an unfolded position in which the first and second side walls have a generally arched cross section;
said base comprising a foldable material which is adapted to rest in the unfolded position substantially horizontally on and conform generally to the generally flat floor of the trench, said foldable material being sufficiently foldable that but for support received from the floor of the trench the material would fold downward under the weight of conveyed fluids, said base being connected longitudinally in both the folded and unfolded positions with said first and second side walls.

17. A conduit comprising: a longitudinally elongated element having a substantially semiround cross section which has an apex area disposed substantially at the top of the element and a pair of displaced longitudinal terminal side edge areas disposed generally at the bottom of the element, the terminal side edge areas defining a generally planar base area therebetween; the elongated element having a plurality of transverse corrugations extending from the apex area to both of said terminal side edge areas; said corrugations comprising outward extending peaks and inward extending valleys, the difference between the outward extension of the peaks and the inward extension of the valleys being the height of the corrugations, said peaks defining an outer surface of the elongated element and the valleys defining an inner surface of the elongated element; the corrugations having a first height adjacent the terminal edge areas, a second height adjacent the apex area, and between the apex area and the terminal edge areas at each point along the semiround cross section the corrugations having a height which is greater than the first and second heights and varies with the tendency of the elongated element to deflect at the same point along the semiround cross section under subterranean loads.

18. The conduit as set forth in claim 17 wherein said inner surface is more parabolic in cross section than the outer surface and said outer surface is more semicircular in cross section than the inner surface.

19. The conduit as set forth in claim 17 wherein said elongated element includes an elongated trough at said apex area for forming a hinge to allow the terminal side edge areas of said elongated element to be moved arcuately toward and away from each other.

20. The conduit as set forth in claim 19 further including a flexible member connected adjacent both of said terminal side edge areas and spanning said elongated element adjacent the base area to define a closed base for said conduit.

21. The conduit as set forth in claim 17 wherein the ratio of the altitude of said apex area from said base area to the width of said base area is generally in the range of 0.63 to 0.65.

22. The conduit as set forth in claim 17 wherein the ratio of the altitude of said apex area from said base area to the width of the base area is in the range of 0.45 to 0.90.

23. The conduit as set forth in claim 22 wherein said ratio is generally 0.65.

24. The conduit as set forth in claim 17 wherein the height of said corrugations varies along the semiround cross section as a function of the bending moment at said point under hydraulic loading.

25. The conduit as set forth in claim 17 wherein the height of said corrugations varies such that the moment of inertia at each point along the semiround cross section is proportional to the bending movement of the semiround cross section at the same point.

26. A longitudinally folded plastic conduit comprising:
- a longitudinally elongated first side wall having a longitudinally extending apex side edge area and a longitudinally extending terminal side edge area, said first side wall being arcuate transverse to the longitudinal direction;
- a longitudinally elongated second side wall having a longitudinally extending apex side area and a longitudinally extending terminal side edge area, said second side wall being arcuate transverse to the longitudinal direction;
- an elongated foldable base operatively connected with the terminal side edge area of the first wall and with the terminal side edge area of the second wall;
- a longitudinal hinge means pivotally connecting the apex side edge areas of the first and second walls; and
- the terminal side edge areas of the first and second side walls being disposed substantially adjacent each other, said base being folded substantially between and inside said first and second side walls, whereby the side walls are adapted to pivot about the hinge moving the terminal side edge areas apart which at least partially unfolds the base from inside the first and second side walls.

27. The folded conduit as set forth in claim 26 wherein said first and second walls are corrugated transverse to the longitudinal direction and are relatively bendable transverse to the longitudinal direction.

28. The folded conduit as set forth in claim 27 wherein the conduit is bent into a coil.

29. A corrugated plastic conduit comprising:
- a first corrugated plastic wall which is elongated along a longitudinal axis and arcuate transverse to the longitudinal axis, the first wall having two longitudinally extending edges,
- a second corrugated plastic wall which is elongated along the longitudinal axis and arcuate transverse to the longitudinal axis, said second wall having two longitudinally extending edges, one of said second wall's longitudinally extending edges being integrally connected with one of said first wall's longitudinally extending edges, whereby the first and second walls form an elongated element having a semiround cross section; and
- a smooth, flexible plastic base which is thinner than said first and second walls, said base being connected longitudinally adjacent one of the longitudinally extending edges of the first wall and one of the longitudinally extending edges of the second wall, said base being freely flexible at least along the longitudinal axis and transverse to the longitudinal axis.

30. The corrugated plastic conduit as set forth in claim 29 further comprising at least one longitudinal hinge means which is integrally formed with at least one of the first and second walls for enabling the conduit to be folded.

31. A corrugated plastic conduit which is disposable in a folded and in an unfolded configuration, said conduit comprising:
- a first corrugated plastic wall which is elongated along a longitudinal axis and arcuate transverse to the longitudinal axis, said first wall having a longitudinally extending apex side edge area and a longitudinally extending terminal side edge area, said first side wall being relatively strong to resist compressive loading forces;
- a second corrugated plastic wall which is elongated along the longitudinal axis and arcuate transverse to the longitudinal axis, said second wall having a longitudinal extending apex side edge area and a longitudinally extending terminal side edge area;
- means for connecting the apex side edge areas of said first and second walls together in such a manner that in the unfolded configuration the terminal side edge areas of the first and second walls are displaced and the connected first and second walls have a generally arch-like cross section transverse to the longitudinal axis, and a generally flat base which is elongated along the longitudinal axis and has a width transverse to the longitudinal axis, said base being foldably connected with the terminal side edge areas of said first and second walls to allow relative folding between the base and the first and second walls, the width of the base limiting the amount by which the terminal side edge areas of said first and second wall can be displaced in the unfolded configuration, whereby the first and second side walls can be folded generally parallel to each other to form the folded configuration of the conduit.

* * * * *